July 15, 1958  R. E. YOUNG  2,843,153
FILAMENT WOUND HOLLOW ELEMENTS AND METHODS
FOR MAKING SAME
Filed Aug. 17, 1953  3 Sheets-Sheet 1
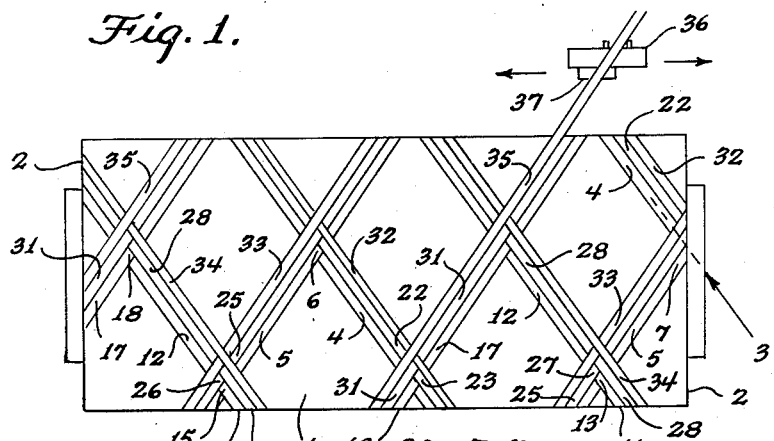
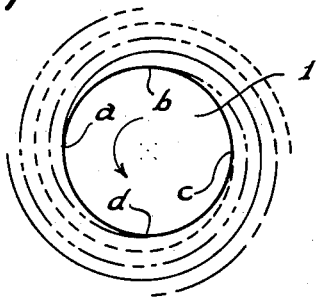
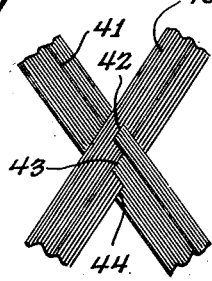
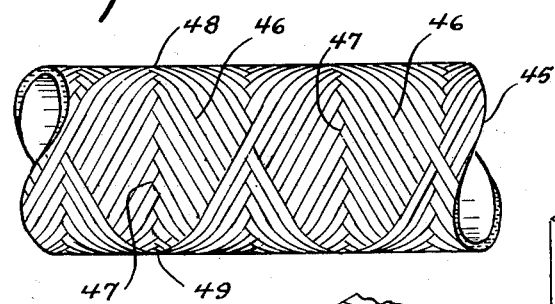
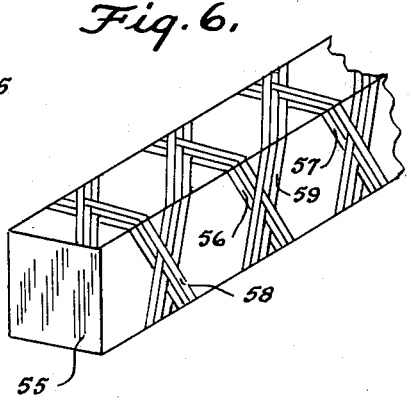
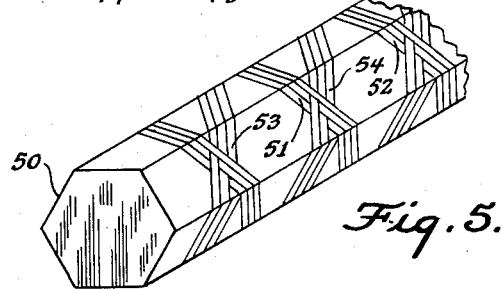
INVENTOR.
RICHARD E. YOUNG
BY
ATTORNEY

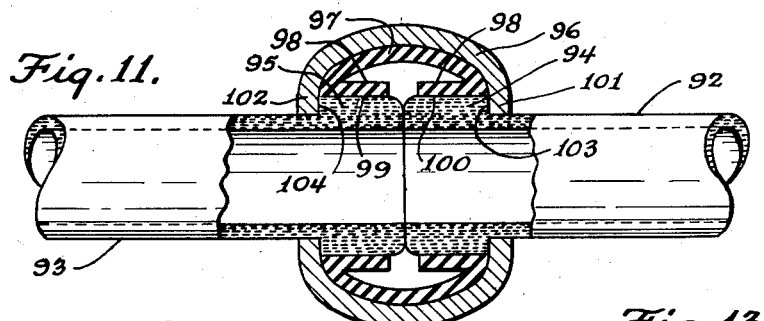
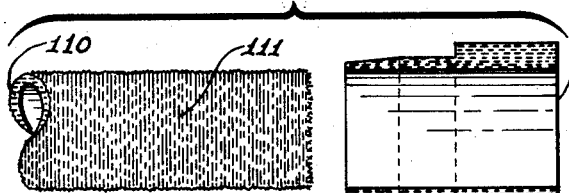
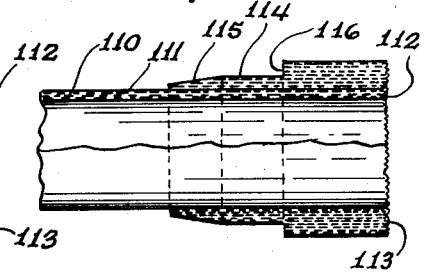
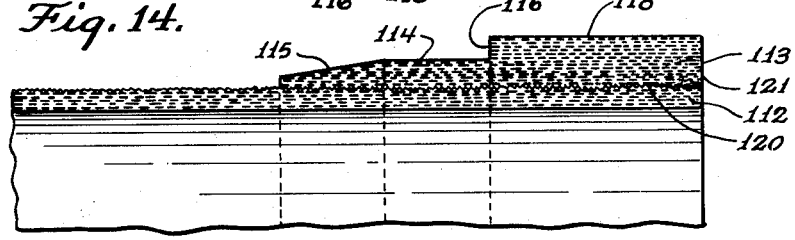
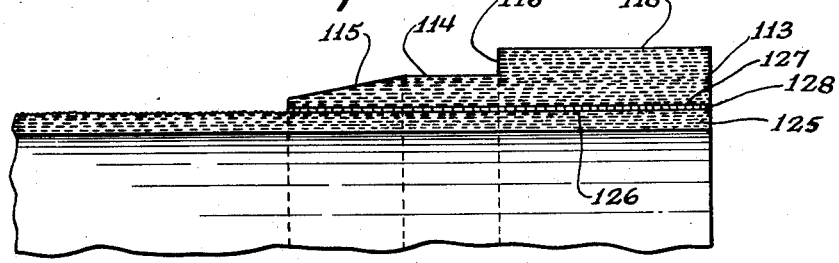
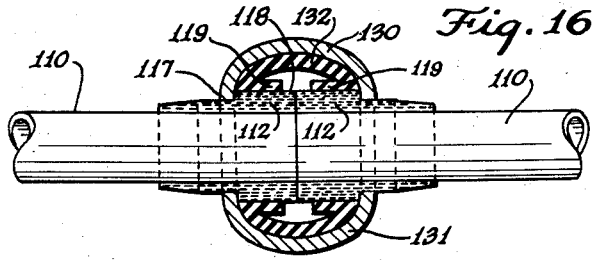

July 15, 1958 R. E. YOUNG 2,843,153
FILAMENT WOUND HOLLOW ELEMENTS AND METHODS
FOR MAKING SAME
Filed Aug. 17, 1953 3 Sheets-Sheet 3

INVENTOR.
RICHARD E. YOUNG
BY Albert M. Parker
ATTORNEY.

United States Patent Office 2,843,153
Patented July 15, 1958

2,843,153

FILAMENT WOUND HOLLOW ELEMENTS AND METHODS FOR MAKING SAME

Richard E. Young, Rocky Hill, N. J.

Application August 17, 1953, Serial No. 374,600

21 Claims. (Cl. 138—55)

This invention relates to filament wound hollow elements and methods for making the same, and is particularly concerned with conduits and containers formed of intermeshed helical filament windings and with methods for forming such conduits and containers.

Though some work has been done in the field of forming hollow elements by the winding of filaments with the inclusion of plastic binders, the application of the filaments and the binder has not been made in a manner to take full advantage of the characteristics of the filaments. In the prior products the filaments are in the nature of reinforcement for a rather thick plastic body. The thickness, weight, and consequent space consumed by them in shipment, as well as in use, have accordingly been excessive. Consequently, the economy has been poor, due to the large quantity of material needed in making up elements of adequate strength. Thus a considerable demand remains for hollow elements, particularly conduits, pipe and pressure vessels formed principally out of filaments of strong material, such as glass fibres with a minimum of binder material.

The product and process of the invention enable that demand to be met and eliminate the drawbacks of the prior art. The elements of the invention are formed principally of filament material, thus cutting down on both bulk and weight. At the same time, the normally weaker plastic material is used merely as a binder and is kept down to a minimum. Such factors as corrosion resistance are fully provided for. The method of the invention also enables the formation of vessels of various shapes, both longitudinal and transverse, while maintaining, or even enhancing, the strength characteristics in doing so.

The invention contemplates the provision of a variety of forms of construction under the general category of hollow elements. Without limitation to this generality the invention provides improved construction for a wide range of conduits, such as pipes, ducts and flumes, as well as tanks, containers, pressure vessels and openwork constructions. It also provides for the covering of existing members for such purposes as reinforcement and protective coatings.

It is, accordingly, a principal object of the invention to provide hollow elements formed out of intermeshed helical filament windings.

Another principal object is to provide methods for the forming of such elements.

Another object is to provide such elements having a variety of shapes, both longitudinal and transverse.

Another object is to provide such elements having walls formed of multiple laminations of intermeshed helical filament windings.

Another object is to provide such elements employing a plastic binder for the filament windings.

Still another object is to provide hollow elements formed out of intermeshed helical filament windings having a plastic binder therefor, which elements have high strength characteristics in relation to thickness and weight.

A further object is to provide such elements in which the expansive characteristics in relation to pressure conditions can be controlled.

A still further object is to provide such elements having high corrosion resistance.

A more specific object is to provide such elements and methods for forming the same with variations in the contours thereof.

Other specific objects are to provide for the forming of pipes out of intermeshed helical filament windings and to provide for the coupling of sections of such pipe by the addition of members formed integrally with the pipe.

Further specific objects are to provide separate coupling elements formed out of intermeshed helical filament windings and to provide methods for the effective securing of such coupling elements to pipes to be coupled.

Additional and more detailed objects of the invention will in part be obvious and in part be pointed out as the description of the invention, taken in conjunction with the accompanying drawing proceeds.

In that drawing:

Figure 1 is a development on a flat plane of half of a cylindrical mandrel with the commencement of the intermeshed helical winding of a filament wound element thereon, illustrating the application and intermeshing of the filament windings.

Figure 2 is an end elevation of a mandrel for the winding of the cylindrical hollow element surrounded by overlapping helixes, illustrating the building up of the elements on to the mandrel.

Figure 3 is an enlarged fragmentary view of a crossover, or build up, position of the windings, as illustrated in Figure 1.

Figure 4 is an elevation of a fragment of complete pipe in accordance with the invention.

Figures 5 and 6 are fragmentary perspective views of the portions of non-circular mandrels with the commencement of the application of filament windings thereto, as illustrated in Figure 1.

Figure 11 is an elevation, partly in section, of two sections of pipe, in accordance with the invention illustrating the employment of integral doublers in the coupling of the sections.

Figure 12 is an exploded view of a section of pipe and a separate coupling collar, both formed in accordance with the invention, with the collar in a position ready to be seated on the pipe.

Figure 13 is a part section, and part elevation, the pipe and collar of Figure 12, showing such pipe and collar in assembled relation.

Figure 14 is an enlarged fragmentary section of a pipe and collar combination illustrating the jointure of a separate collar and pipe as in Figures 12 and 13.

Figure 15 is a similar view showing an alternate form of joint; and

Figure 16 is a fragmentary sectional view illustrating the coupling together of two sections of pipe employing collars as illustrated in Figures 12–15.

Figure 7:
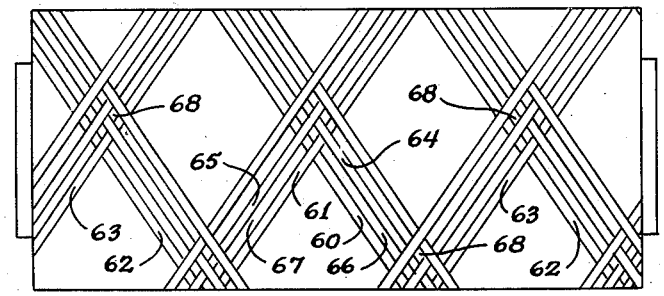
Figure 7 is a view similar to Figure 1 of the commencement of a modified form of the invention, wherein the windings are in spaced relation to provide an openwork pattern.

As already pointed out, this invention comprehends a wide variety of hollow elements and methods of forming the same. To simplify the presentation, however, the invention will be illustrated and described as applied to pipe, conduits, open-work members and pipe couplings. Thus, in Figure 1 the commencement of the formation of a pipe is illustrated. Here, one-half of a cylindrical mandrel 1 is shown as developed onto the flat and this mandrel will be understood as being rotated counterclockwise as viewed from its right hand end, indicated by the directional arrow in Figure 2.

The ends 2 of the mandrel are here shown as cut off at right angles to the axis thereof, it begin understood, however, that the end geometry would be such as would be appropriate to engage the windings in a manner to provide for a reversal from right hand to left hand helical windings. This would be a simple convexly curved formation where a cylindrical element is to be formed, with those curved ends subsequently being severed, as indicated in the Figure 1 showing. When, however, hollow elements with special formations are desired, the end geometry of the mandrel, would be appropriate for the shape desired.

A number of filaments in band-like form of the desired width are applied to the mandrel by means of a carriage which travels from one end of the mandrel to the other and back again. These bands may have a plastic binder applied to the filaments thereof, at or adjacent to the carriage, or the binder may be applied at the position where the filaments engage the mandrel. At the outset, the mandrel itself may be given a coating of binder to give the operation a proper start. What is important, however, is that the binder be kept at a minimum commensurate with the securing of the filaments together, with the filling of any spaces between them, and with the securing of the bands to adjacent bands. As the winding proceeds, excess binder will be squeezed outwardly from between the filaments so that the quantity of binder supplied may be reduced as the winding continues.

A circuit of a filament band is considered to be the complete path from the beginning of a righthand helix at one end of the mandrel, through the end pattern at the other end of the mandrel, back as a lefthand helix, plus the second end pattern and to the beginning of the next right hand helix. The commencement of such a circuit is indicated by the arrow 3 in Figure 1. The right hand helix of this band circuit is indicated at 4 and its lefthand return is indicated at 5. Thus, it will be seen that it commences at the righthand end, as viewed in Figure 1, passes up over the mandrel at the desired helix angle, is reversed at the lefthand end, and comes back in the band portion 5 which crosses over the band portion 4 at the positions 6 and 7.

The showing in Figure 1 is of a two-circuit, or cycle, pattern arrangement. In other words, after the first circuit is completed as just described, a second circuit is started commencing at a position at the righthand end of the mandrel at 180 degrees away from the commencement of the first circuit. Thus, when the lefthand return portion 5 completes the first circuit it passes around the righthand end formation in a path which brings it back onto the mandrel at its righthand end as shown in Figure 1 at a position 180 degrees away from the commencement of the initial band portion 4. This brings the righthand helix of the second circuit into view at the position 11 in Figure 1. From there, as indicated by the reference character 12, the band portion 12 immediately crosses over the band 5 at the position 13, goes around the far side to the mandrel at the appropriate angle and appears again at 14, crossing the band 5 again at 15. It is reversed at the lefthand end formation and comes back at 17, crossing over its righthand portion 12 at the position 18, then around the far side of the mandrel, returning to the face again at 19. There it crosses over the band portion 4 at 20, goes up over the front of the mandrel, and on to the back portion again to the right end formation to complete the second circuit.

When the first and second circuits have been completed, forming what can be considered as a basic pattern, a sufficient change has been brought about by the gearing between the mandrel rotation and the filament delivery carriage to advance the mandrel exactly the width of the band of filaments. This gearing produces the progression illustrated, by which the bands build up alongside of each other. Thus, the band portion 17 is reversed in direction, going over the end formation, and when reapplied to the mandrel is laid down in a righthand portion 22 of the next circuit or cycle. This portion 22 commences at a position 360 degrees, plus the width of a band, from the commencement of the portion 4. It then follows the portion 4 around, alongside of it, crossing the band portion 17 at 23, being reversed at the lefthand end and coming back in the lefthand helix portion 25, crossing the band 12 at 26. The portion 25 passes around the back of the mandrel and emerges over the front to again cross the band portion 12 at 27. From there it again passes over the end formation, reverses itself around the end formation, and comes back to the face of the mandrel to start the next circuit at a position spaced 180 degrees from the place where such circuit commenced.

The 180 degree shift brings the next band portion 28 on to the face of the mandrel at a position alongside of the band portion 12. The portion 28 shortly crosses over both of the band portions 5 and 25, then over the band portion 17, goes around the back of the mandrel, and emerges at 29 to again cross the band portions 5 and 25. Then the band portion 28 is reversed at the lefthand end to return as lefthand helix portion 31, crossing over the band portion 12 and its own righthand portion 28. Then the portion 31 goes around the back of the mandrel, emerging again at the face to cross the band portions 4 and 22. Next it crosses the band portions 12 and 28 and continues until it goes on to the end formation.

The band portion 31 is directed over the end formation in a manner to begin the next circuit in the portion 32 at a position spaced 180 degrees plus half the width of a band from the commencement of the portion 28. Thus the portion 32 lies alongside of the portion 22, first crossing over portions 17 and 31, then over portions 5 and 25. Reversing into the portion 33 over the lefthand end formation, it first crosses the portions 12 and 28, then the portions 4, 22 and 32, and again crosses 12 and 28 as it returns to the righthand end formation. Continuing after another 180 degree shift, the band again appears at 34 alongside of the portion 28 crossing all three of the band portions 5, 25 and 33, then the band portions 17 and 31, and goes around the back of the mandrel. Coming up over the face, it crosses portions 5, 25, and 33, is reversed around the left-hand end formation, emerging as the lefthand helix portion 35, crossing over all previously laid righthand band portions as it again returns to the righthand end formation.

It is to be understood that the band heretofore referred to is continuous, as it applies a complete coverage to the mandrel. Thus as the band portion 35 completes its circuit, subsequent material from the continuous band is directed onto the mandrel, being applied by means of a suitable guide on carriage 36 which may also apply plastic directly to the mandrel or to the band through a coating head 37, or by other suitable means, as the carriage travels and feeds the band material onto the mandrel. From the laying down of the circuits as just indicated, and by following the system described, it will be apparent that the diamond spaces between the lays of the bands will be reduced and eventually completely filled up with fibrous material and binder until complete coverage of the mandrel is effected. While this is going on, the intermeshing of bands will continue and will build up at the crossover positions forming herringbone patterns representing intermeshing of bands. These herringbone patterns progress around the mandrel.

Since the initial circuit crosses over on itself as it returns in the form of a lefthand helix, and as subsequent circuits build up similarly on themselves and on already laid circuits, it will be apparent that there are always twice as many crossover positions as there are circuits. Also it would be apparent that the lays of the filament bands at any given level are common throughout all intermeshing crossover formations. Thus there is structural continuity at the various levels, while the herringbone or intermeshing pattern of the bands at the various levels produces structural continuity throughout the hollow element. It is also evident that the build-up of an element in this manner creates a structure principally made up of fibre or filaments with the binder therefor being kept at a minimum.

The cross over formations build up spirally with respect to the cross section of the pipe. This build-up is illustrated diagrammatically in Figure 2. The initial crossovers at the surface of the mandrel, such as those at 18, 6 and 7 in Figure 1, are illustrated at the position a. Similar crossovers take place along a line at the top of the mandrel as illustrated at b, and at 180 degrees from a, as illustrated at c. The crossovers, such as 15, 20 and 13, are illustrated at d. The various spirals running outwardly from the positions a, b, c and d are illustrative of the manner in which spiral overlays or intermeshing build up around the mandrel. The spirals will of course be tighter than here illustrated, with the openwork formation here shown being exaggerated for the purposes of illustration.

To increase the wall thickness of the pipe or other element to that desired for the required strength, the process of laying on filaments in the manner just described in Figure 1 is repeated right on top of the covering provided by the Figure 1 formation and in the same manner. Thus several laminations, each made up of intermeshing bands at various levels, may be applied one on top of the other until the desired thickness is achieved. The plastic binder being squeezed outwardly as the bands are applied and being additionally applied along with the bands, though kept down to the barest minimum, will hold these laminations together. Thus a pipe, or other element of desired thickness, can be formed whose body is made up principally of strong fibre glass filaments directed at angles to resist both longitudinal and transversre stress. Little space is wasted with binder so that as wall thickness increases it is as a result of the addition of filaments, with direct increase in strength. Such an element, though of moderate thickness, can have high bursting strength imparted thereto.

As already indicated, the plastic material employed as a binder is kept to a minimum and is squeezed out as the application of the bands progresses. On the completion of that application, any excess of the binder can be wiped off while it remains in fluid state. Thereafter, the pipe, or other element, can be cured by appropriate heating if the binder is of a thermosetting type, or by allowing it to cool and set, if the binder is thermoplastic.

When it is desired to use a thermosetting binder, any of the epoxy resins may be used. As applied, these are in the form of a liquid material containing the latent reactive preparations. These will polymerize at room temperature if sufficient time is allowed, or polymerization may be effected more quickly at higher temperatures. When thermoplastics are employed, they are allowed to set in normal manner. The selection of the particular plastic to be used depends, of course, on such factors as characterisitcs desired, the price and workability. If coloring is desired, other than clear resins may be employed, such as those loaded with pigment or dyes. Structural additives may also be included in the resin, such as the inclusion of fibres to create a random pattern within and between the bands for increased strength.

Once the resin is cured, the pipe, or other element, may be readily removed from the mandrel. For pipes it is merely necessary to cut off one, or both, ends of the end formations built up in the reversing process. Some elements with both ends reduced can be wound on a liner which serves as the mandrel. Others can be formed in two pieces and be joined together, while still others can be wound on specially formed mandrels.

In Figure 3 there is a fragmentary showing, somewhat enlarged, of a crossover and intermeshing of bands, such as occurs at 6 or 18 in Figure 1. From here it is apparent that no separate bands, making up the element portions 40 and 41, are particularly distinguishable as such, except where the intermeshing takes place at 42 and 43 and 44. At these intermeshing positions the building up of the herringbone pattern, as already described, is readily seen.

In Figure 4, there is shown a fragmentary section of a completed pipe 45 made in the manner illustrated in Figure 1. Here the distinguishing diamond appearance of the pattern is seen at 46 resulting from the cross-lay of the fibrous bands in the pattern. Also, it is seen how the herringbone pattern 47, created by the overlaying of the bands, extends between the remote apexes 48 and 49 of the diamond patterns.

A polygonal mandrel 50 is illustrated in Figure 5, with a conduit being developed on the surface thereof in the same manner as the circular pipe is being formed in Figure 1. Thus, angled helical band portions, such as 51 and 52, comparable to the band portions 4 and 12 of Figure 1, are shown in their right-hand progression along the mandrel, and as returning at 53 and 54 toward the starting point in left-hand helixes, comparable to the band portions 5 and 17 of Figure 1. Similarly, Figure 6 illustrates the formation of a conduit square in cross-section by means of a square mandrel 55. The makeup of this conduit commences with bands 56 and 57 comparable to the band portions 4 and 12 in Figure 1, and lefthand helix return portions 58 and 59 comparable to the return portions 5 and 7 of the bands in Figure 1. The intermeshing of the bands in the forms of Figures 5 and 6 takes place in substantially the same manner as illustrated in Figure 1, as does the complete buildup of the pipe, or conduit, regardless of its cross-sectional shape, so long as that shape is convex throughout and is devoid of re-entrant portions.

The modification shown in Figure 7 illustrates the make-up of a conduit providing an openwork formation usable for such purposes as a tumbling barrel for washing, plating or chemical treatment of articles. The make-up is similar to that of Figure 1 except that the band portions are spaced apart by a desired increment from circuit to circuit as the various circuits are applied to the mandrel. Thus as the band being laid down completes the basic pattern through the right and lefthand helixes 60 and 61 of the first cycle, and 62 and 63 of the second cycle, the end shift is not merely 180° plus one-half a band width, but is 180° plus one-half a band width and plus one-half the space width between the bands. The next circuit, made up of portions 64 and 65, is accordingly spaced from the portions 60 and 62 by the desired spaces illustrated at 66 and 67. The same is true of the next circuit of the second basic pattern and such spacing continues to be introduced as the covering of the mandrel develops.

Figure 8:
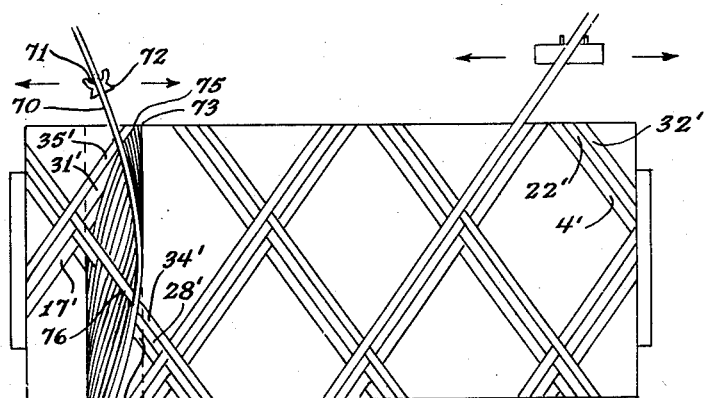
Figure 8 is a view similar to Figure 1, illustrating the addition of a localized doubler, or thickened portion, in the formation of a pipe, in accordance with the invention.

The intermeshing of the respective bands is achieved in the same manner as in the Figure 1 showing, with the important distinction that diamond shaped openings such as shown at 68 will appear at the crossover positions and will increase in number as the intermeshing of the bands increases. Thus when the complete pattern is formed on the face of the mandrel, there will be a myriad of diamond shaped openings through it. These openings will be preserved as the thickness of the covering is built up by laminations of intermeshed bands since subsequent bands will be laid right on top of those already present and will be spaced in the same manner. Appropriate winding grooves and diamond shaped bands on the mandrel may be used in combination with proper timing systems. Thus a strong, light weight corrosion resistant openwork element is provided. The showing in Figure 8 illustrates the manner in which localized variations in pipe thickness and consequent localized variations in the exterior contour of a pipe or other hollow element may be applied in the forming of that element. This feature of the invention is illustrated from the standpoint of employing thickened portions, or doublers, to pipes in order to enable the coupling of sections of such pipe together. It is, of course, to be understood that this particular use is merely illustrative since the application of additional localized material as here shown is pertinent to the addition of any extra material for securing attachments of all sorts, bearing members, bolt rings, etc. to hollow elements. Insofar as pipes and conduits are concerned, the extra material provides for drilling and tapping to receive securing members, provides for external threading, for the reception of threaded fittings or for a variety of other purposes.

Inasmuch as the basic pattern of the main windings in Figure 8 is the same as that described and illustrated in respect to Figure 1, except for where the auxiliary pattern passes through it, the same reference characters will be used for the basic pattern as used in Figure 1 with primes applied thereto indicative of the existence of both a close similarity and a difference. The only additional description needed is that regarding the application of the auxiliary pattern and of the main basic pattern where such patterns intermesh.

The auxiliary filament band 70 applied to the mandrel by means of the carriage 71, which may suitably apply binder to the band, or to the mandrel, by some means as indicated at 72, is preferably narrower than the band employed in laying on the basic pattern to prevent the doubler from building up too fast. The doubler band 70 is wound onto the mandrel by an independently timed mechanism and must complete a full circuit for each revolution of the mandrel. Thus, a band portion which starts at position 73 passes down over the front face of the mandrel to a position such as 74 then over the back of the mandrel as viewed in Figure 8 to form a complete helix and to start the next one at a position 75 alongside of the position 73.

Application of the basic pattern to the mandrel in the manner here shown requires that the mandrel make eleven revolutions before the beginning of a repetition of the winding pattern. Under these circumstances, eleven circuits of the doubler will be deposited between the passing of a right-hand helix such as 12' and the next occurrence of that event by the passing of the helix 28'. The manner in which these helixes of the doubler pass between the band portions 28' and 34' is illustrated at 76 in Figure 8.

It is not necessary to start the independent pattern from which the doubler is formed at the same time that the basic or main pattern is started. On the contrary, it is ofen desirable to start the doubler pattern after the first or a subsequent complete application of intermeshed windings from the basic pattern has been applied to the mandrel. It will be readily seen that the intermeshing of the primary structural windings and the doubler windings offer advantages with respect to the communication of forces from the primary structure to the doubler or vice versa. Thus, failure due to the concentration of forces at local points is guarded against.

Figure 9:
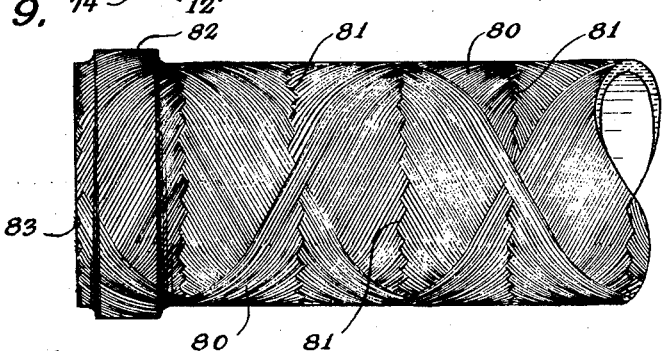
Figure 9 is a fragmentary elevation of a section of completed pipe formed in accordance with the Figure 8 illustration.

A fragment of pipe with a doubler applied thereto in the manner just described is illustrated at 80 in Figure 9. There the build-up of the main body of the pipe by the application of helical windings thereto is shown by the herringbone pattern 81, the same as in Figure 4. Enlargement of the pipe at the doubler is illustrated at 82 while the herringbone pattern recurs at 83 showing that the basic pattern carries over the doubler, and that after sufficient doubler material was provided within the body of the pipe, additional helical windings from the main pattern were laid over it. The rather sharp corners at the ends of the doubler, shown here and in Figure 10, would actually be rounded. The sharpness here is to enhance the illustration.

Preferably the same binder would be used for the doubler as for the main windings. Curing of the pipe proceeds in the same manner whether the doubler be present or not, merely taking into consideration that curing through the thickened doubler portion would require more time than the curing of the thinner pipe wall.

Figure 10:
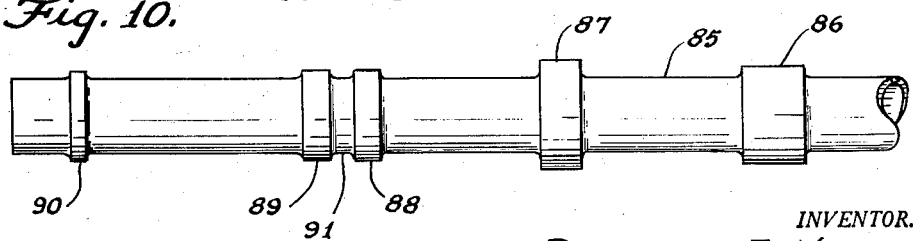
Figure 10 is an elevation of a length of pipe formed in accordance with the invention and having a plurality of doublers incorporated therein.

In Figure 10 a section of pipe 85 is illustrated with doublers 86, 87, 88, 89 and 90 applied thereto at various positions along the length thereof. The pipe here would be made up the same as the pipes illustrated in Figures 8 and 9, the showing here being for the purpose of illustrating the applicability of a number of different doublers along the length of a section of pipe or other element. The different sizes and extents of the doublers such as 86, 87 and 90, are indicative of variations in pattern that may be applied to a pipe or other element all at one time following the Figure 8 system. The application of doublers 88 and 89 close together is indicative of the provision of what amounts to a groove 91 between the doublers.

In Figure 11 the coupling together of two sections of pipe 92 and 93 by the use of integral doublers 94 and 95 is illustrated. The doublers 94 and 95 form integral collars extending right up to the pipe ends for the reception of a coupling member 96. This coupling member may be of any conventional type among which are those having half housings bolted together at the extremities of their diameters. Such couplings embrace a pressure responsive gasket, such as 97, therewithin, which gaskets are normally C-shaped in cross section having inwardly extending lips 98 for engaging flat surfaces on the exterior of the pipe. Here, however, the lips 98 engage the outer surfaces of the integral collars 94 and 95. Those surfaces 99 and 100 are preferably ground smooth for effective seating of the gasket lips. Such grinding can readily be effected once the pipe is completed and cured, the same as if the pipe were of metal.

The key sections 101 and 102 of the coupling 96 which serve to prevent endwise separation of the pipes engage the end shoulders 103 and 104 formed on the collars 94 and 95 and seat down on the exterior of the pipe extending therefrom. The shoulders 103 and 104 are ground at the proper angle for the reception of the sections 101 and 102 in holding engagement therewith.

Though the structure here shown is merely that of collars against which the key sections 101 and 102 engage, it is, of course, to be understood that longer doublers could be applied to the pipe with grooves ground therein for reception of the key sections. Alternatively, closely spaced doublers, such as 88 and 89 in Figure 10, could be applied for the formation of such grooves.

Where a piping installation is being made, particularly one of any length, standard lengths of pipe with integral doublers wound thereon could be used for most of the installation and the over-all length might be such that end of the pipe line would come at the end position of a standard section pipe. If it does not, however, the invention comprehends manners of providing sections of the length needed to fill in at the ends. One procedure is to form lengths of pipe with integral doublers spaced therealong, the same as illustrated in Figure 10, except that the doublers would have uniform exterior contours rather than the varying ones in the Figure 10 illustration. A section of pipe providing such a plurality of doublers along its length could then be cut in such a position, or positions, that a length for filling up the required space would be available with doublers adjacent to the ends thereof. In instances where such a procedure would not be effective, an alternate solution is provided, as illustrated in the forms of Figures 12 to 16.

In Figure 12 there is shown a section of pipe 110 the same as the pipe of Figure 4. The pipe 110 is, however, given a different exterior appearance, indicated at 111, to illustrate that it is in the rough, uncured state with binder material remaining on the exterior surface. A coupling collar for application and securing to such pipe is shown at 112. This collar has an interior diameter close to the diameter of the pipe 110, such diameters being so chosen that the collar 112 may be pushed onto the pipe 110 while in its uncured state without removing the excess binder remaining on the surface of the pipe.

The length of the collar is so chosen that its engagement with the pipe will prevent leakage through the bond and will be sufficiently strong to prevent the collar from pulling off the pipe as the pipe is subjected to internal pressure when coupled in place as part of a pipeline. Thus the collar 112 has an enlarged coupling end 113 with a reduced shank 114 extending therefrom. Shank 114 may be tapered off on its exterior at 115 if desired. The collar 112 is preferably formed of the same material as the pipe already described and is formed in the same manner as employed in the forming of that pipe.

One manner of forming the collar 112 is to form a section of pipe of sufficient thickness to provide the enlarged coupling end 113, following the procedure illustrated in Figures 1 and 2. Such a section of pipe would then be cured and its exterior ground to provide the geometrical formation shown in Figure 12. In doing so, material is ground off from the outside to form the surfaces 114 and 115 and leaving a radially extending shoulder 116 at the inner end of the enlarged section 113. This shoulder must be of sufficient height to prevent the key section of the coupling housing, as shown at 117 in Figure 16, from pulling up over the shoulder 116 as pressure is applied to the pipe. Also the shear strength of the material making up the enlarged end 113 must be sufficient to prevent shearing off of the enlargement along the radial line of the portion 114 in response to pressure within the pipe. The enlarged section 113 must also have its exterior surface 118 finished off for proper seating of the lips 119 of the C-shaped gasket as seen in Figure 16. This finishing is effected by grinding the pipe material once it has been cured, whether before or after the collar has been secured to the pipe.

When the collar 112 has been slid onto the pipe end 110, as illustrated in Figure 13, the pipe is cured in the manner required, depending upon the binder material used, and the collar becomes strongly affixed thereto. This joint is shown in an enlarged section in Figure 14, from which it is seen that the joining layer of binding material 120 fills any recesses existing in the interior surface of the collar member 113, as well as those in the exterior surface of the pipe 112. Finally, if the aligned ends of the pipe and the collar member leave a rough surface, that surface may be smoothed off by simple grinding as illustrated at 121.

In the alternative arrangement illustrated in Figure 15, the collar member 113 is as already described, being cured and finished to provide the desired surfaces. Here, however, the pipe 125 has already been cured prior to the joining of the coupling collar thereto. Thus the exterior surface 126 of the pipe, where the coupling collar overlies the same, is ground smooth. The same may be done to the interior surface 127 of the collar member if needed. Normally, however, the interior surface of a member formed on a mandrel in the manner heretofore described will be sufficiently smooth that no grinding of the interior of the collar will be necessary.

The bonding of the collar in the Figure 13 form to the pipe 125 is effected by means of a layer of bonding material 128 between the inner surface of the cured collar and the outer finished surface of the cured pipe. The space for receiving this layer must be adequate to enable an effective bond to be made, though preferably the layer of bonding material is maintained as thin as possible. Keeping the bond thin prevents the trapping of air in it, consequently creating a stronger bond and precluding any leakage therethrough. Preferably the material used for the bond is the same as that employed as a binder in the forming of the pipe and of the collar.

An alternative manner of forming the collars 112 would be to form a section of pipe of the desired thickness and applying a doubler thereto where the enlarged coupling end 113 is needed. In fact a long length of pipe with doublers spaced at desired intervals can be formed ready for this use. Then it is merely necessary to cut off a section of pipe of the desired length, including a doubler at one end thereof, and do such grinding to the exterior surfaces as is necessary to provide the desired geometrical pattern. In either of the instances where the coupling collar is ground out of a thick section of pipe or is formed from a section of pipe with a doubler incorporated therein, the spiral build-up of the filament bands and the interlacing of them assures the transmission of forces from one part to the other of the coupling collar in a manner to assure adequate strength in the body of that collar even though grinding is effected of such depth as to produce the shoulders 116.

Regarding the application of collars in accordance with the invention to corresponding pipe, assuming both pipe and collar to be made of the same material and the collar to be secured to the pipe while in the green uncured state, the following table is illustrative of the dimensional relationships found to be effective:

| Pipe Size | Wall Thickness of Pipe 110, inches | Maximum O. D. of Collar 112 | Length of Collar 112 | Height of Shoulder 116 |
|---|---|---|---|---|
| 1 inch | .050 | 1.389 | 1.438 | .080 |
| 3 inches | .0669 | 3.542 | 1.538 | .110 |
| 6 inches | 0.132 | 6.869 | 2.84 | .180 |

The relationships just given apply to the coupling of pipes whose wall thickness is based on a porosity stress of 35,000 p. s. i. for internal pressure of 1500 p. s. i. For pipes of different wall thickness and subject to different pressures, the collar dimensions and the bonding of the same to the pipe may, of course, be varied. The relationships set forth in the foregoing table will, however, serve as a basis for determining what such different relationships should be.

With regard to the coupling of pipe ends as illustrated in Figure 16, little more need be said. The pipe sections 110 have collars such as 112 applied thereto in one of the manners already indicated. The coupling housings 130 and 131 may be formed of two half sections bolted together in the manner known in the art, or may be of other suitable formation. On the other hand, they may be specially formed for this purpose out of material made in the same way as the pipes and coupling collars heretofore described. In so forming them, the added factor is gained of corrosion resistance throughout. The annular gasket 132 of C-shape in cross section is received within the coupling housings and engaged with the coupling ends on the pipe in the manner known in the art. Also, of course, the smooth end surfaces of the pipes and coupling collars are brought together.

In the methods shown and described in Figures 1 and 2, a two-cycle, or circuit, pattern arrangement is employed for the initial covering of the mandrel and subsequent build-up of pipe thickness. It is to be understood, however, that a four-cycle, or circuit, arrangement could be employed with the same band continuing throughout the complete pattern. This would merely call for the starting of each circuit at positions spaced 90° apart on the mandrel instead of 180° as in the form illustrated. The space shift provided by the gearing would then take place at the end of the fourth cycle rather than at the end of the second cycle, as in the procedure described.

In the foregoing description, glass has been indicated as the preferable filament material. This is due to the strength, corrosion resistance and availability of such material on an economical basis. It is, of course, to be understood, however, that the method of the invention is not limited to the use of such filaments, but rather that any desired and suitable filament material, now or hereafter available, can be used if desired. Also fibre glass is the presently preferred material for the formation of elements in accordance with the invention, but, here again the invention contemplates the formation of elements employing filaments of other than fibre glass, as desired for the particular construction.

Though the invention has been described in detail as embodied in pipes, conduits, and combinations, and methods of forming same, it is of course to be appreciated that such presentation is for illustrative and not limiting purposes. From such illustration it will be evident to those skilled in the art that the invention procedures are fully applicable to the forming of a wide range of hollow elements. Such elements themselves, as well as the manner of forming the same, are embraced within the scope of the invention. It is accordingly to be understood that changes may be made in the above method, and modifications may be made in the structures and combinations of the same which embody the invention without departing from the scope of the invention. It is thus intended that all matter contained in the description, or shown in the accompanying drawing, shall be interpreted as illustrative and not in a limiting sense.

The invention claimed is:

1. A hollow element having a wall composed substantially of a plurality of intermeshed helical filament windings, including, the first of said windings lying in a cylindrical zone with the beginning point of said first winding lying on a circle of said cylindrical zone, the beginning point of the next immediate winding of said plurality being located on said circle and said windings at said beginning points being spaced a substantial distance apart.

2. A hollow element as in claim 1 and including a third winding having its beginning point on said circle immediately adjacent said beginning point of said first winding.

3. A hollow element as in claim 2 and including an additional winding having its beginning point on said circle immediately adjacent said beginning point of said first winding.

4. A hollow element as in claim 1 and said wall including a binder securing said filaments together.

5. A hollow element having a wall composed substantially of a plurality of intermeshed helical windings of bands formed of filaments, including, the first of said bands lying in a cylindrical zone with the beginning point of said first band lying on a circle of said cylindrical zone, the beginning point of the next immediate band of said plurality being located on said circle and said bands at said beginning points being spaced a substantial distance apart.

6. Those steps in the method of forming hollow elements which comprise winding a helical pattern out of filament material with the turns of each helix in spaced relation, beginning an outgoing helix of said pattern on a circle of the cylinder established by said helix, and after said outgoing helix has run the desired length in one direction, reversing its direction in a return helix crossing said outgoing helix at a plurality of positions, commencing another outgoing helix beginning at a point on said circle in substantially spaced circumferential relation with respect to said first helix and winding said other helix with the turns thereof in spaced relation to cross said first helix at an angle and at a plurality of positions.

7. Method as in claim 6 and including, commencing subsequent outgoing helixes at beginning points circumferentially spaced from each other and from the beginning points of said first and second outgoing helixes and eventually commencing another outgoing helix at a beginning point positioned adjacent the first of said beginning points with the filaments of said first and said another outgoing helix substantially in contact.

8. A hollow element having a wall and said wall including a localized peripheral thickened portion, said wall formed throughout its length of laminations of helically wound intermeshed filaments and a binder therefor and said localized thickened portion comprising an additional set of helically wound filaments having portions interlaced with said windings of said laminations, said additional set of windings commencing at a position spaced from one end of said wall and terminating at a position spaced from the other end thereof.

9. A hollow element having a wall comprising a plurality of intermeshed helical filament windings, said wall having a main portion of one thickness and a localized portion of a different thickness, said main portion being formed of a plurality of windings, the first of said windings lying in a cylindrical zone with the beginning point of said first winding lying on a circle of said cylindrical zone and the beginning point of the next immediate winding of said plurality being located on said circle in circumferentially spaced relation with respect to said beginning point of said first winding, and said localized enlarged portion being formed of an additional helical winding interlaced with said first and second windings of said plurality, the enlargement formed by said additional winding commencing at a position spaced from one end of said wall and terminating at a position spaced from the other end thereof.

10. The method of forming a hollow element having a localized peripheral thickened portion in the wall thereof which comprises, winding a set of helixes out of filament material from a beginning zone to a return zone and back again, winding another helix of filament material across the path of said set of helixes, interlacing said other helix with said set of helixes, commencing said winding of said other helix at a position spaced from said beginning zone, terminating said winding of said other helix at a position spaced from said return zone introducing a settable binder into said wall and setting said binder to bind said windings together.

11. The method as in claim 10 and including, terminating the winding of said other helix and winding further helixes from said set over the windings of said other helix.

12. A pipe formed of filament wound material which comprises, a pipe wall formed of helically wound intermeshed filaments and a thickened section including within said pipe wall, said thickened section including additional helically wound filaments intermeshing with said filaments of said pipe wall for a limited distance along the length of said pipe, there being a plurality of turns of said additional filament winding between each adjacent turn of said original helically wound intermeshed filaments.

13. A pipe formed with an integral coupling collar forming an outwardly extending enlargement at one end thereof which comprises, a pipe wall formed of initial helically wound intermeshed filaments with the windings thereof laid side by side, and an additional helical winding incorporated in said initial helical windings for a short distance along the length of said pipe adjacent one end thereof, said additional helical windings intermeshing with said initial helical windings forming said wall, said initial and said additional windings being secured together by means of a settable binder, and the exterior surface of said pipe at said enlargement being formed with a smooth peripheral surface and with a shoulder extending radially inwardly from said peripheral surface at the inner side of said enlargement.

14. A collar for the coupling of plain end pipe which includes an elongated tubular member, said tubular member being formed of helically wound intermeshed filaments secured together by a binder, said tubular member being formed with an annular abutment shoulder thereon, said shoulder lying in a plane at right angles to the axis of said tubular member and extending radially for a substantial portion of the thickness of said tubular member, certain of said filaments terminating at said shoulder, said terminating filaments meeting said shoulder at a variety of angles.

15. The method of securing coupling collars formed of filament windings to filament wound pipe which comprises, forming said pipe and said coupling collars by helically winding a plurality of filaments and applying a settable binder to said filaments, leaving the exterior of said pipe in rough unfinished state with an excess of binder thereon, forming said collar with an internal diameter substantially the same as the external diameter of said pipe, seating said collar over said pipe adjacent one end thereof, with a portion of said excess of binder between the exterior of said pipe and the interior of said collar and curing said pipe to set said binder and to complete the joint between said collar and said pipe.

16. The method of securing coupling collars formed of filament windings to pipes formed of filament windings comprising, forming such pipes and collars by winding a plurality of filaments, applying a settable binder to said filaments to secure said filaments together, curing said binder to set the same, forming smooth internal and external surfaces on said collar, forming a smooth external surface on said pipe extending along said pipe for a distance equal to the length of said collar, and of substantially the same diameter as the internal diameter of said collar, applying a settable bonding material to said smooth portion of said pipe, applying said collar over said pipe at said smooth portion thereof, and securing said pipe and collar together by setting said bonding material.

17. A hollow element formed with openings through the wall thereof which comprises, a wall formed of helically wound intermeshed bands, each of said bands being formed of a plurality of filaments, certain of said bands being parallel and being spaced from each other throughout and defining openings between pairs of parallel bands where said pairs intermesh and a binder securing said filaments into bands and said bands together at the intermeshings thereof.

18. Those steps in the method of forming a hollow element with perforations through the wall thereof which comprises, winding a first set, comprising a plurality of bands of fibrous material, on a supporting member in the form of crossed helixes while commencing certain of said helixes of said set at substantially spaced angular positions with respect to the commencement of certain other helixes of said set and commencing another set of similar bands at positions spaced sidewise on said supporting member with respect to said bands of said first set.

19. A hollow element having a wall composed substantially of a plurality of intermeshed helical filament windings, including, the first of said windings lying in a cylindrical zone with the begining point of said first winding lying on a circle of said cylindrical zone, the beginning points of the immediately subsequent windings of said plurality being located on said circle, all of said windings at said beginning points being spaced apart a substantial distance from each other and cured bindermaterial between said windings to bind said windings together.

20. A hollow element having a wall composed substantially of a plurality of helical filament windings, each of said windings having turns of its helix reversed upon and intermeshing with other turns of its helix, the first of said windings extending at a first helix angle and lying in a cylindrical zone with the begining point of said first winding lying on a circle of said cylindrical zone, and a subsequent winding of said plurality extending at a different helix angle from said first helix angle, the beginning point of said subsequent winding lying on said circle, and a cured binder within said wall and binding said windings together.

21. A hollow element comprising a body portion having a wall and said wall including a localized peripheral thickened portion, said wall being formed of reversely extending helixes formed of bands with said bands of said helixes being intermeshed, and said thickened portion including an additional band wound within and around said wall and having portions interlaced with portions of said helical bands of said reversed helixes, said thickened portion being limited to a portion of the length of said wall.

References Cited in the file of this patent

UNITED STATES PATENTS

| | | |
|---|---|---|
| Re. 11,856 | Wardwell | Sept. 18, 1900 |
| 480,158 | Wardwell | Aug. 2, 1892 |
| 1,011,090 | Subers | Dec. 5, 1911 |
| 1,978,211 | Longhead | Oct. 23, 1934 |
| 2,111,639 | Petersen | Mar. 22, 1938 |
| 2,146,218 | Kimmick | Feb. 7, 1939 |
| 2,370,193 | Reid | Feb. 27, 1945 |
| 2,467,999 | Stephens | Apr. 19, 1949 |
| 2,573,361 | Rodgers et al. | Oct. 30, 1951 |
| 2,594,693 | Smith | Apr. 29, 1952 |
| 2,614,058 | Francis | Oct. 14, 1952 |
| 2,653,887 | Slayter | Sept. 29, 1953 |
| 2,731,067 | Miller | Jan. 17, 1956 |